(12) United States Patent
Scholz

(10) Patent No.: US 7,104,600 B2
(45) Date of Patent: Sep. 12, 2006

(54) SADDLE

(76) Inventor: Hans Scholz, Mittelstrasse 97, Bad Neuenahr-Ahrweiler (DE) 53474

( * ) Notice: Subject to any disclaimer, the term of this patent is extended or adjusted under 35 U.S.C. 154(b) by 0 days.

(21) Appl. No.: 10/788,477

(22) Filed: Mar. 1, 2004

(65) Prior Publication Data

US 2004/0174051 A1 Sep. 9, 2004

(30) Foreign Application Priority Data

Mar. 3, 2003 (DE) ................................ 103 09 352

(51) Int. Cl.
*B62J 1/00* (2006.01)
(52) U.S. Cl. ...................................................... 297/201
(58) Field of Classification Search ............. 297/195.1, 297/201, 205, 207, 312, 314; 403/122, 135, 403/141

See application file for complete search history.

(56) References Cited

U.S. PATENT DOCUMENTS

| | | | | |
|---|---|---|---|---|
| 608,682 A | * | 8/1898 | Jamieson | 297/201 |
| 694,875 A | * | 3/1902 | Meighan | 297/201 |
| 4,387,925 A | * | 6/1983 | Barker et al. | 297/201 |
| 5,123,698 A | * | 6/1992 | Hodges | 297/201 |
| 5,492,428 A | | 2/1996 | Hellon et al. | |
| 5,722,718 A | * | 3/1998 | Still et al. | 297/215.15 |
| 6,056,356 A | * | 5/2000 | Unger, Jr. | 297/201 |
| 6,068,333 A | * | 5/2000 | Dixon | 297/201 |
| 6,082,923 A | | 7/2000 | Maughan | |
| 6,164,861 A | * | 12/2000 | Maughan | 403/135 |
| 6,402,235 B1 | * | 6/2002 | Letendre | 297/195.1 |

FOREIGN PATENT DOCUMENTS

| | | |
|---|---|---|
| DE | 93 478 | 8/1897 |
| DE | 101 448 | 2/1899 |
| DE | 827 008 | 1/1952 |
| DE | 295 17 194 U1 | 3/1996 |
| DE | 296 08 190 U1 | 9/1996 |
| DE | 201 00 412 U1 | 7/2001 |
| DE | 202 12 353 U1 | 12/2002 |
| EP | 1 145 944 A1 | 10/2001 |

* cited by examiner

*Primary Examiner*—Peter R. Brown
(74) *Attorney, Agent, or Firm*—David S. Safran

(57) ABSTRACT

A saddle for pedal-powered devices, especially bicycles, with two spaced apart seat halves (1), each of which supports one half of the buttocks, and with a cup joint arrangement on its bottom. The cup joint arrangement (5) has an essentially hollow spherical socket (6) and a cup element (7) which can be moved in it. A support rod (11) has two supports (10), each of which is attached to a respective cup element (7), for connecting the saddle to a saddle support (13) by the support rod (11). The cup joint arrangements (5) each have a device for limiting the range of motion of the cup element (7) in the socket (6). The cup joint axes, around which the cup elements (7) can be moved in their respective socket (6), are each outwardly inclined. Thus, a solid seat on the saddle and ergonomic pedaling are enabled.

26 Claims, 6 Drawing Sheets

SADDLE

BACKGROUND OF THE INVENTION

1. Field of the Invention

The invention relates to a saddle for pedal-powered devices, especially bicycles, with two seat halves which are spaced apart from one another and which are each designed for one half of the buttocks, each seat half having a cup joint arrangement on its bottom, the cup joint arrangement comprising an essentially hollow spherical socket and a cup element which can be moved in it, there being a support rod with two supports which are each attached to the cup element so that the saddle can be connected to a saddle support by means of the support rod and the cup joints each having a means by which the range of motion of the cup element in the socket is limited.

2. Description of Related Art

A saddle of the above mentioned type is known, for example, from German Utility Model DE 201 00 412 U1.

Saddles, especially bicycle saddles, are generally built according to a static principle, in spite of padding, spring systems and extensive elimination of those points which can cause pressure points for the bicycle rider. For this reason, the force expended by the rider, specifically his body and muscle force, is not optimally converted into the given circular rotation of the pedals. The friction of the upper leg on the saddle edge, the pressure load on the buttocks, overshooting of the leg motion—the knee and hip joints execute a more "S"-shaped than round motion relative to the pedal axis—as well as rocking of the upper body of the rider back and forth, in sum, cause a waste of the expended force so that, overall, an uneconomical sequence of motions is achieved. Add to this, the discomfort caused by pressure points for the rider, which moreover can lead to health impairment and health damage. In spite of the use of padding, such as gel cushions, circulation problems of the genitals, inflammations of the urinary tract, microtrauma of the testes or prostate up to infertility and impotence have been reported.

For some time, spring-mounted saddle supports and even completely spring-mounted bicycles have been available. These spring-mounted saddle supports and fully spring-mounted bicycles are advantageous, but are of relevance primarily for relieving the spinal column. The aforementioned problems cannot be avoided with them.

Furthermore, bicycle saddles are known which, as described at the beginning, have two seat halves which are spaced apart from one another and which are each designed for one half of the buttocks. Such a saddle is known, for example, from German Utility Model DE 295 17 194 U1. In this saddle, the two seat halves are spaced apart from one another and are movably supported, but in any case, only a motion which corresponds to tilting of the seat halves around an axis which runs essentially parallel to the bottom and perpendicular to the lengthwise axis of the bicycle, which lengthwise axis corresponds essentially to the direction of travel, is possible. Thus, it is a problem in this known saddle that the possible motions of the two seat halves cannot follow the biomechanically most favorable motions of the legs, pelvis, and upper body when bicycling.

This problem is supposed to the solved in the saddle which is known from German Utility Model DE 201 00 412 U1 in that the seat halves are each supported on a joint such as a rubber joint or a ball joint. Here, there is supposed to be a limitation to a small rotary segment. However, the saddle described in German Utility Model DE 201 00 412 U1 does not enable a solid and comfortable seat so that it has not become popular in practice.

The prior art discloses a plurality of other saddles with two seat halves which are spaced apart from one another and which are each designed for one half of the buttocks, for which reference is made, for example, to published German Patent Applications Nos. DE 93 478 A, DE 101 448 A and DE 827 008 B.

SUMMARY OF THE INVENTION

Proceeding from the initially described saddle with two seat halves which are spaced apart from one another and which are each designed for one half of the buttocks, a primary object of the invention is to provide such a saddle which ensures use essentially free of pressure points with optimum transfer of force to the pedals and simultaneously a solid seat.

Proceeding from the initially described saddle, the aforementioned object is achieved in that cup joint axes around which the cup elements can be moved in their respective socket are each inclined outward.

Viewed from the front or back, the cup joint axes thus form a V shape. Preferably, the supports of the support rod which are connected to the cup elements run along the cup joint axes so that, viewed from front or back, the supports are likewise V-shaped relative to one another, and therefore they have a greater distance on their ends attached to the cup elements than on their ends facing away from the cup elements.

Because the cup joint axes around which the cup elements can be moved in their respective socket are outwardly angled, in accordance with the invention, at the same time, the range of motion of the cup element in the socket being limited, the result is that the two seat halves can each tilt less to the inside than the outside. In particular, the result can be that the two seat halves, when tilted inward at the end of the range of motion, form an essentially plane seat surface. The two seat halves can each be angled much farther to the outside; this accommodates the ergonomic actuation of the pedals without counterpressure by the saddle.

It has been found that it is advantageous if the cup joint axes include an angle which is in the range between 10° and 30°. In particular, according to a preferred development of the invention, it is provided that the cup joint axes include an angle of 20°. Especially preferably, the supports of the support rod correspond to the cup joint axes so that the supports have a corresponding identical angle relative to one another.

When using the saddle of the invention, therefore in its mounted state, it is furthermore preferred that the cup joint axes are also forwardly inclined. Thus, as a result, less tilting of the two seat halves to the rear than to the front is enabled. It is especially possible in this way not to allow tilting of the two seat halves to the rear beyond the horizontal. That the cup joint axes are tilted to the front, for, example, can be achieved by a correspondingly made support rod. However, the mounting of the support rod on the saddle support must also be considered, currently available saddle supports generally enabling adjustment of the tilt range of the support rod and thus of the saddle to the front or back.

Basically, it is possible to achieve a range of motion of the cup element in the socket of the respective cup joint arrangement in different ways. According to one preferred development of the invention, it is provided that the means for limiting the range of motion of the cup element in the socket the cup element has a collar on its top end and/or on its bottom end which strikes the edge of the socket at the end of the range of motion. In this way, the angle within which the cup element can be moved in the socket can be exactly predetermined. If there is a collar both on the top edge and also on the bottom edge of the cup element, it is a double collar cup joint which is located in an annular socket.

According to a preferred embodiment of the invention, it is especially provided that the edge of the socket and the collar of the cup element, which collar at the end of the range of motion strikes the edge of the socket, are matched to one another such that extended resting of the collar of the cup element on the edge of the socket occurs. Specifically, this means that the collar of the cup element and the edge of the socket which interact with it are angularly matched to one another so that, not only do the two elements rest on one another at one point, but they at least rest along a line. In this way, the forces which act between the cup element and the socket are better distributed; this reduces wear of the cup joint arrangement overall. Moreover, the collars are especially well suited as guide elements for the motion of the cup joint. Essentially, sliding motion of the collars on the edge of the annular socket is enabled; the stop can act as a sliding stop.

The cup elements can be connected to the supports in different ways. According to a preferred embodiment of the invention, it is provided that the cup elements are provided with an internal thread and the ends of the supports, which ends are attached to the cup elements, are each provided with a corresponding external thread so that the cup elements can be screwed onto the end of the supports. Furthermore, the cup elements, according to a preferred development of the invention, can have a mounting section on their end facing the respective end of the support. For example, a tool such as wrench can be placed on this mounting section in order to screw the cup elements to the supports.

There can be two seat halves without a connection to one another. However, according to a preferred development of the invention, there is an elastic spacer between the two seat halves. This elastic spacer can be preferably compressively loaded to a certain extent so that, in the unloaded state, the two seat halves are not inclined either to the outside or to the inside, and are preferably spaced 2 cm from one another. This elastic spacer between the two seat halves is especially advantageous when dismounting from the saddle. As an elastic spacer, according to a preferred development of the invention, there is rubber tape attached between the seat halves.

Basically, a plurality of cap joints for the saddle of the invention can be used. However, according to a preferred development of the invention, the cap joints are made as flanged bearings. They can be made separately from the seat halves and can be mounted on the seat halves, for example, via screw connections. According to a preferred embodiment of the invention, the seat halves each have a bottom plate, the respective flanged bearings being integrated into the respective bottom plate. The bottom plate and thus also the flange bearings can preferably be made of glass fiber reinforced plastic material in this case.

Furthermore, it has been found to be advantageous that the respective cup joint is provided under the center of gravity of the respective seat half. Moreover, the cup joint axes preferably lie in one plane. While the supports are typically made the same length, it can also be provided that the supports are of different length in order to compensate, for example, for malpositions of the pelvis.

The shape of the two seat halves also acquires great importance. While basically round or oval seat halves can be used, according to a preferred embodiment of the invention, it is provided that the seat halves each have the shape of a half heart with a short and rounded tip which points forward. Furthermore, here it applies that, preferably, the major axes include an angle which is in the range between 50° and 65°, preferably 57°, along the respectively greatest extension of each seat half. The major axes along the respective greatest extension of each seat half typically run through the end of the tip and the center of gravity of the seat half. In this way, the saddle shape enables optimum leg guidance and ergonomic pedaling. According to a preferred development of the invention, it is furthermore provided that the facing edges of the two seat halves run roughly parallel to one another, specifically preferably, as indicated above, at a distance of roughly 2 cm or somewhat less.

Finally, according to a preferred development of the invention, it can be provided that the supports have a spring means or damping means. This spring means or damping means is used primarily to relieve the spinal column.

In particular, there is now a plurality of possibilities for embodying and developing the saddle as claimed in the invention. In this respect reference is made to the claims which are subordinate to claim 1 and to the following detailed description of one preferred embodiment of the invention with reference to the drawings.

DETAILED DESCRIPTION OF THE INVENTION

Figure 1:
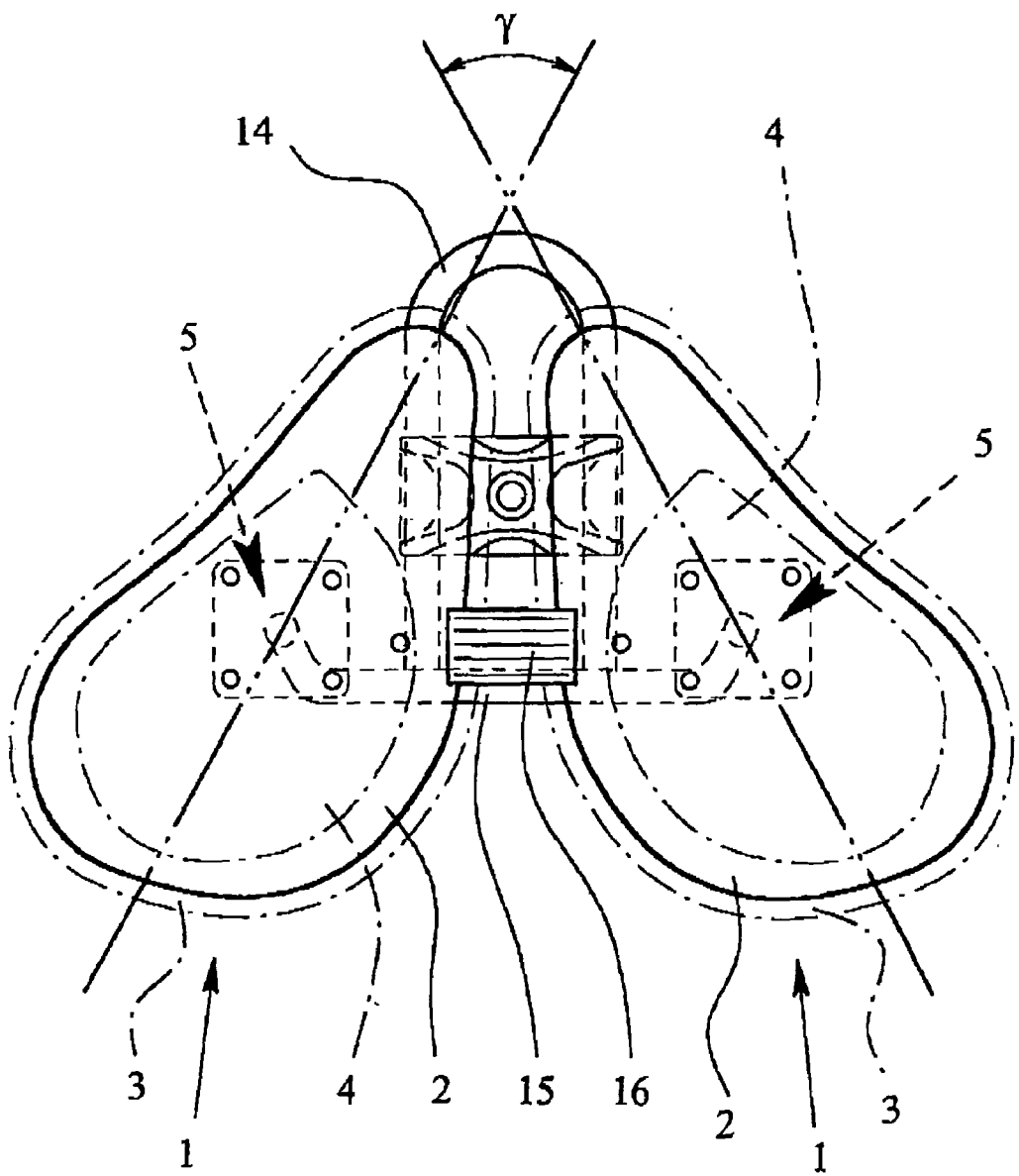
FIG. 1 is a plan view of a saddle according to a preferred embodiment of the invention.
Figure 2:
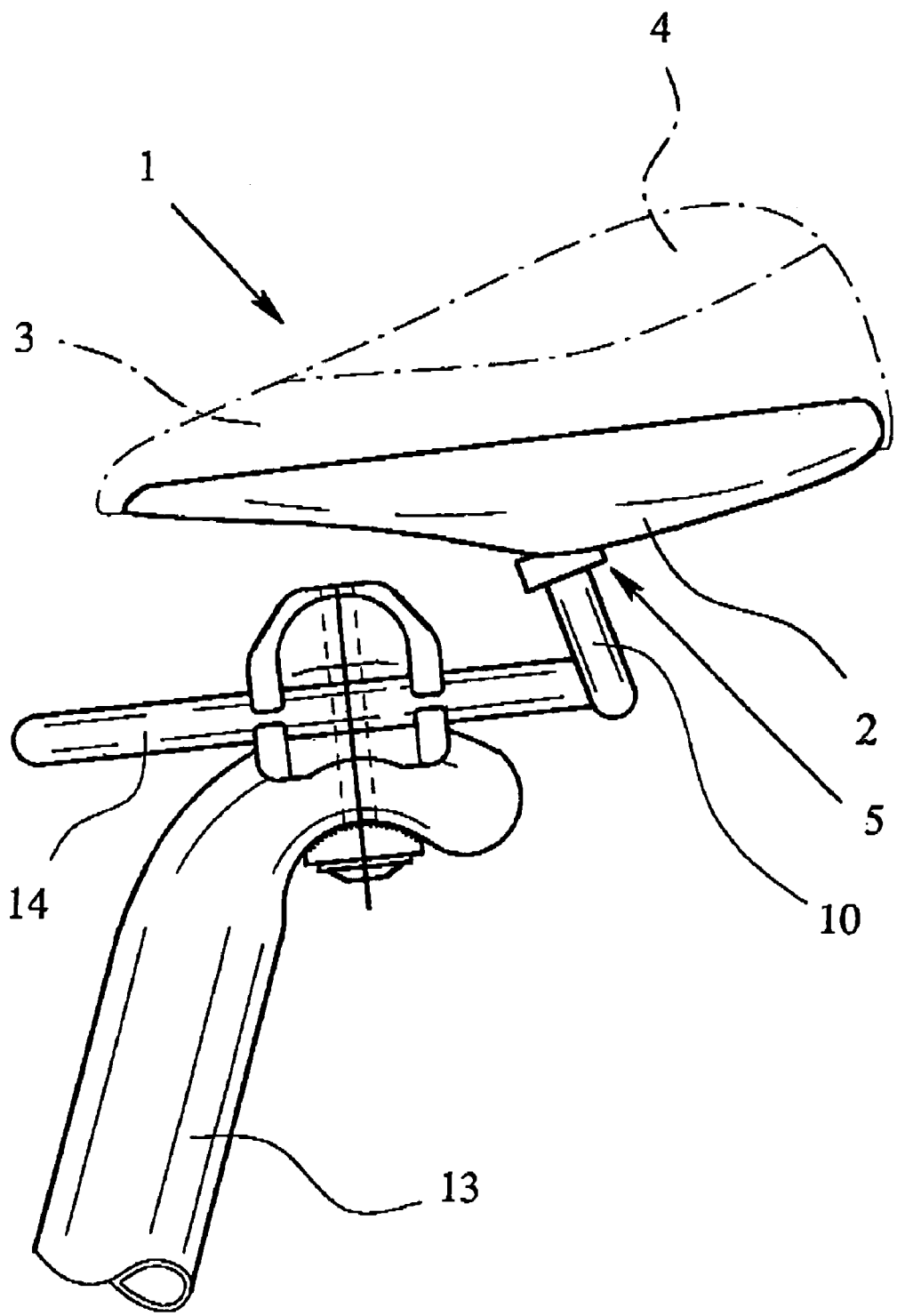
FIG. 2 is a side view of the saddle of the preferred embodiment of the invention.

FIG. 1 shows a bicycle saddle according to a preferred embodiment of the invention, the saddle having two seat halves 1 which are spaced apart from one another and each of which is designed for one half of the buttocks. As is apparent especially from FIG. 2, the seat halves 1 each have a bottom plate 2 and padding 3. For reasons of comfort, the padding 3 is provided with a gel insert 4. The gel insert 4 is used essentially for relief of the sharp-edged ischia. They determine essentially also the distance of the two seat halves 1 from one another or the location of the padding 3. The distance of the ischia for an adult is typically a maximum 90 mm, the distance forward being reduced to roughly 40 mm so that the distance, width and length of the seat halves are dimensioned accordingly. The padding 3 and the gel insert 4 are finally covered with a cover of, for example, leather or an artificial leather material which is not further shown. Otherwise, it can also be provided that the padding 3, the gel insert 4 and the cover are provided as a unit which can be detachably mounted on the bottom plate 2, for example, by means of a Velcro® hook and loop type closure (not shown).

On the bottom of each of the seat halves 1, there is a respective cup joint arrangement 5 in the form of a flanged bearing. The cup joint arrangements 5 are attached by screws to the bottom plates 2, but can also be made in one piece with the bottom plates 2. The bottom plates 2 are preferably made of glass fiber reinforced plastic material.

Figure 6:
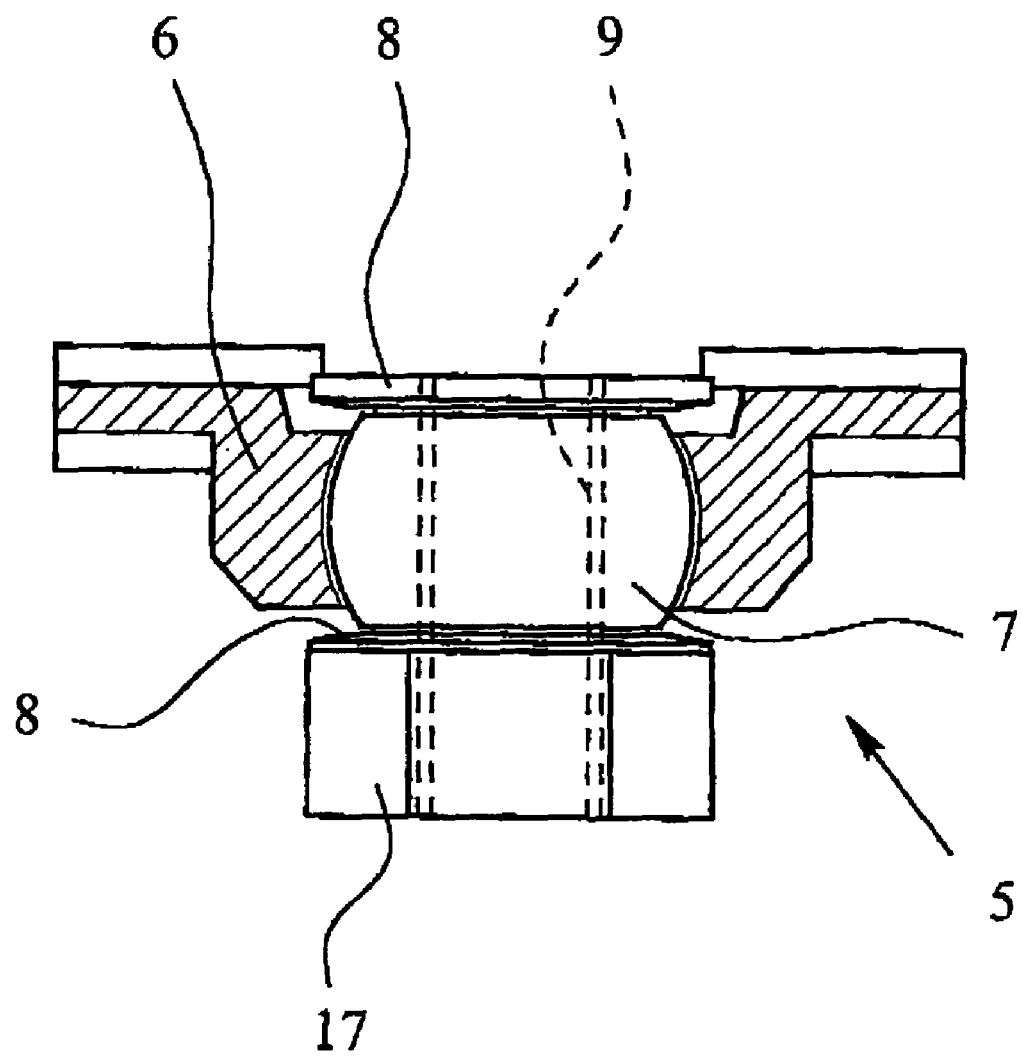
FIG. 6 shows the cup joint arrangement of the saddle with the socket thereof being shown in cross section.

As is especially apparent from FIG. 6, the cup joint arrangement 5 has an essentially hollow spherical socket 6 and a cup element 7 which can be moved in it. The cup element 7 has a collar 8 at each of on its top end and its bottom end as means for limiting the range of motion of the cup element 7 in the socket 6. The collar 8 strikes the edge of the socket 6 at the end of the range of motion. Here, the edge of the socket 6 and the collar 8 which strikes the edge of the socket 6 at the end of the range of motion are angularly matched to one another such that the collar 8 of the cup element 7 rests in an extended manner on the edge of the socket 6.

The cup elements 7 are each provided with an internal thread 9. The ends of the supports 10 of the support rod 11 each have a corresponding external thread 12 that is screwed into this internal thread 9 so that, overall, the seat halves 1 of the saddle can be connected via the support rod 11 to a conventional saddle support 13. A respective mounting section 17 is used to screw the supports 10 into the cup elements 7. To connect to a conventional saddle support 13, an essentially U-shaped section 14 of the support rod 11 is used, as can be seen especially in FIG. 1.

Figure 5:
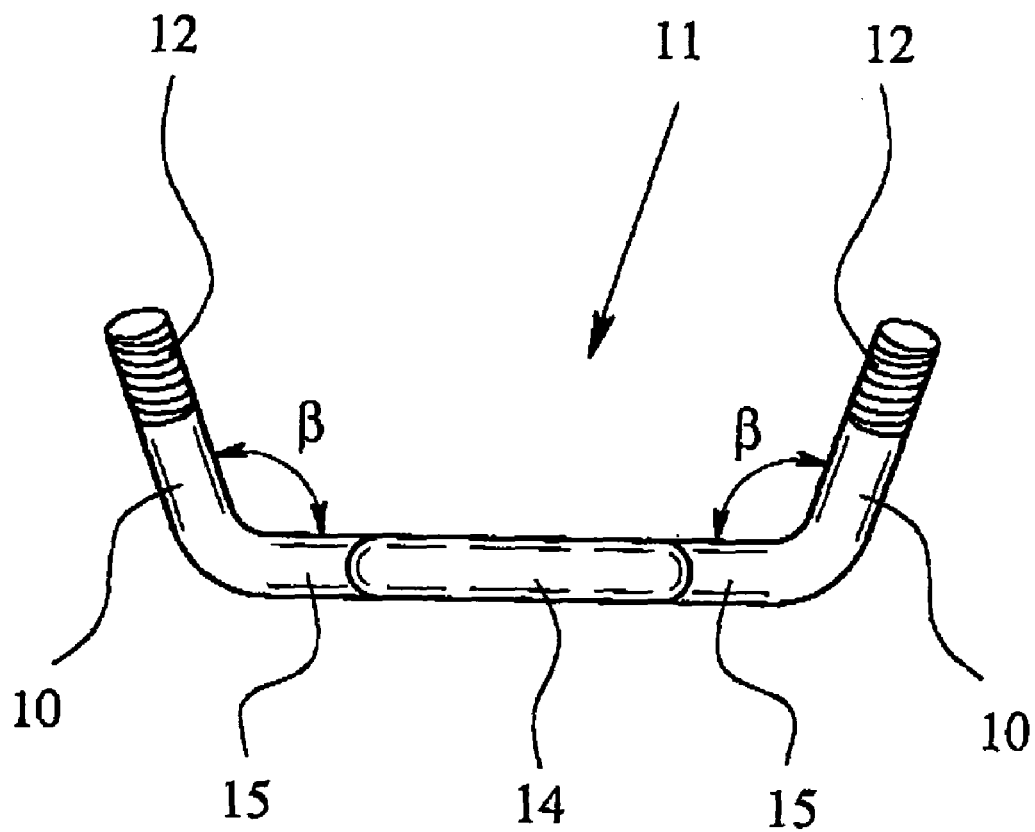
FIG. 5 is a front view of the support rod of the saddle shown in FIG. 4.

FIG. 5 shows that each the supports 10 angled outward at an included angle β of roughly 100° relative to the section 15 of the support rod 11 which connects the two supports 10. Thus, the cup joint axes around which the cup elements 7 can be moved in their respective socket 6 are likewise outwardly angled, by which the seat halves 1, measured on the horizontal, can be angled less to the inside than to the outside.

Figure 3:
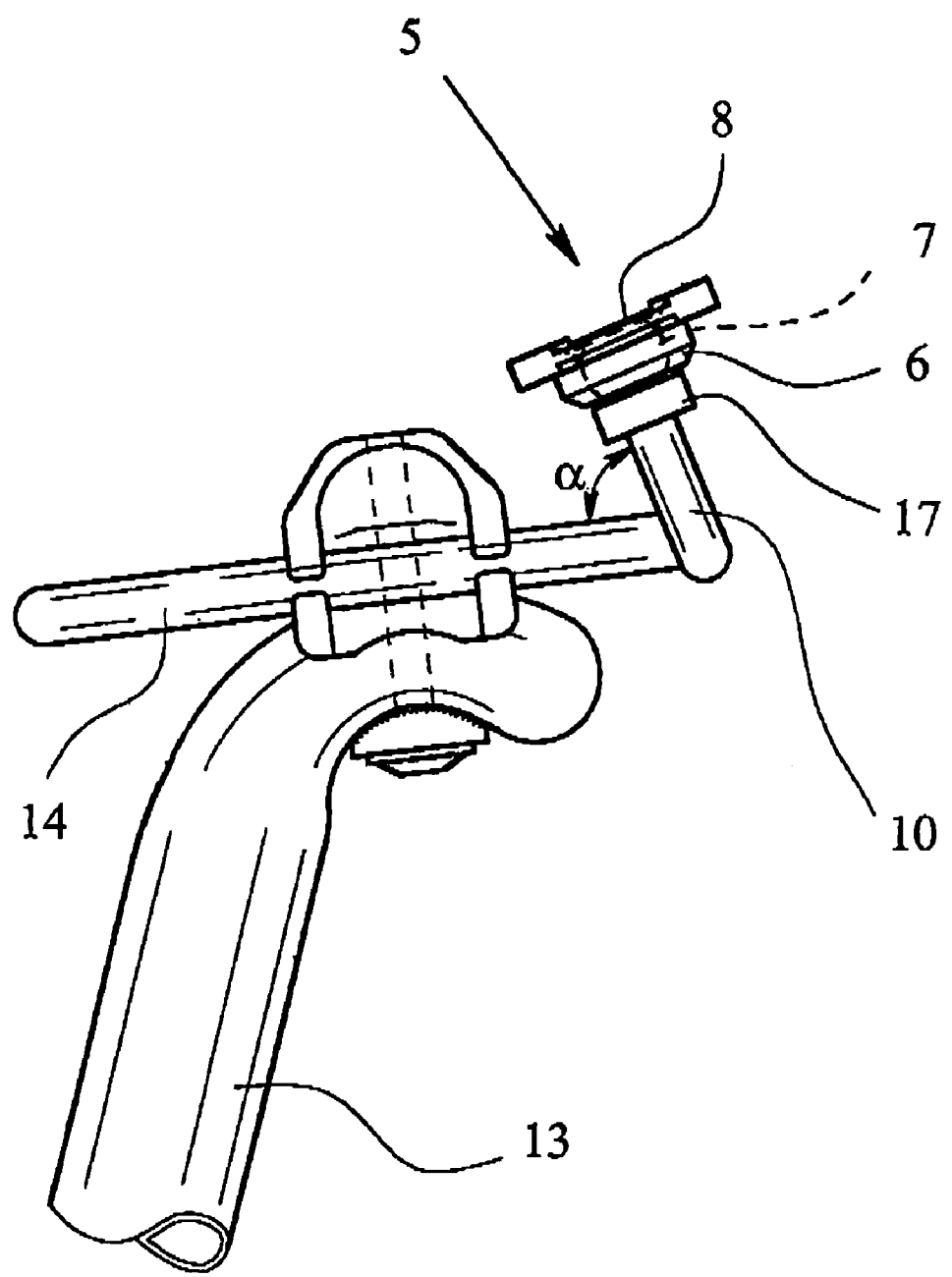
FIG. 3 is a side view of the saddle of the invention with the seat halves removed.
Figure 4:
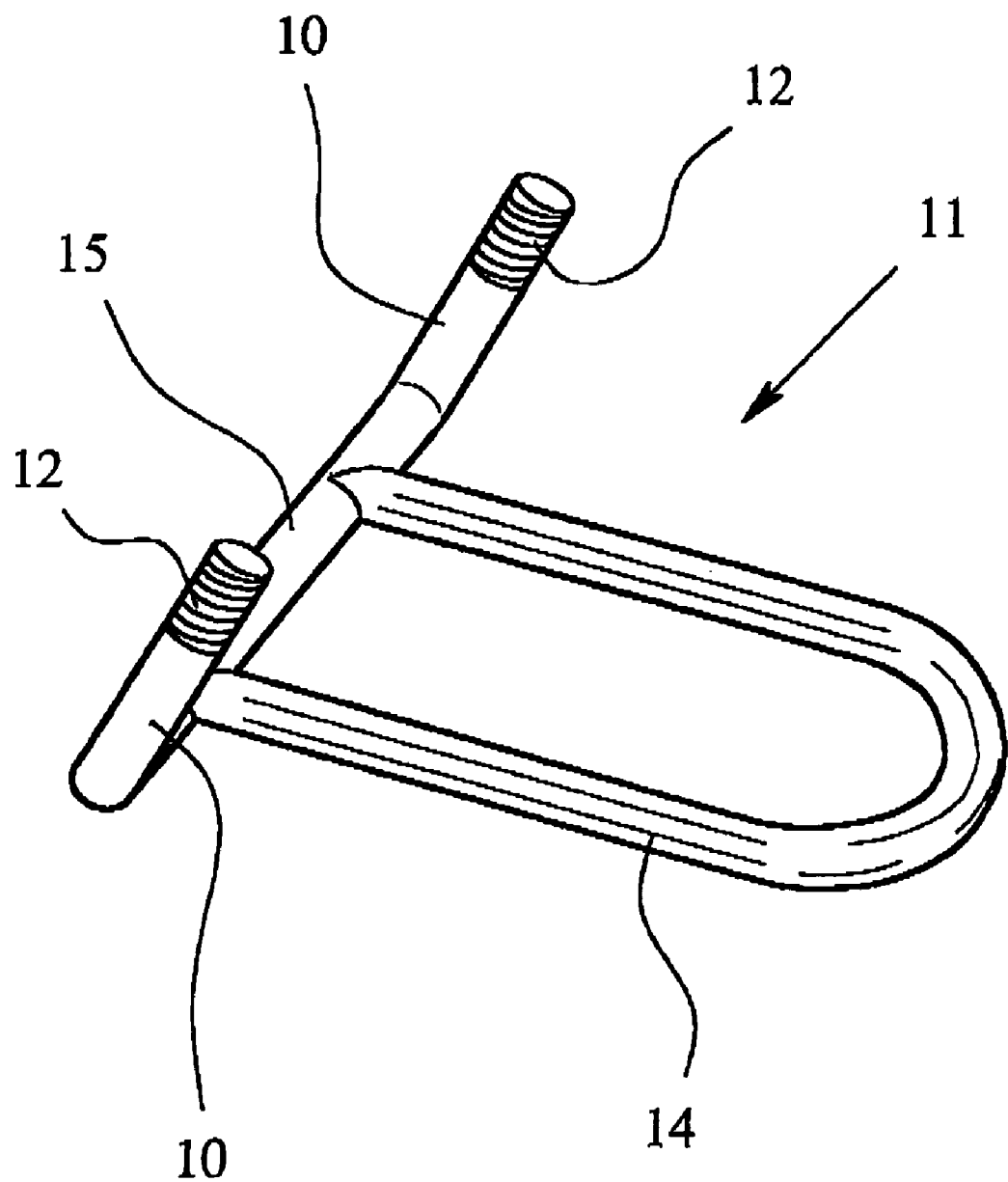
FIG. 4 is a perspective view of the support rod of the saddle of the invention.

Moreover, the supports 10 in the state mounted on the saddle support 13 are also forwardly inclined; this, likewise measured on the horizontal, results in only slight rearward tilting, but greater tilting of the seat halves to the front. The angle α (FIG. 3) between the supports 10 and the U-shaped section 14 of the support rod 11, in the preferred embodiment of the invention, is 74°. The associated advantages have been explained above. In order to fix the two seat halves 1 in a suitable position in the unloaded state, therefore, for example, for mounting, there is an elastic spacer 16, in the form of a rubber tape, extends between the two seat halves 1.

It has been found that it is advantageous for the included angle between cup joint axes to be in the range between 10° and 30°, preferably 20°. It is especially preferred for the supports 10 of the support rod 11 to correspond to the cup joint axes so that the supports have a corresponding identical angle relative to one another. If the cup axes correspond to the supports 10, and if the support rods each show an angle β of 100°, the included angle between the cup axes will be 20°. However, in general, it is also possible for the cup axes not to correspond to the support rods (such an embodiment is not shown). In such a case, the included angle between the cup axes is important, since this angle determines the possible positions of the seat halves and the preferred value of 20° and the range of 10°–30° between should still be maintained in such a case.

Each of the two seat halves, viewed from above, is essentially in the shape of half a heart having a short and rounded tip which points forward. The facing edges of the two seat halves 1 run essentially parallel to one another. The major axes shown in FIG. 1 along the greatest extension of the seat halves 1 include an angle of γ=57° in the preferred embodiment of the invention described here. Thus, the two seat halves 1 offer support to the ischia with the surrounding muscle and soft tissue to an adequate degree, the rounded tips of the seat halves 1 being short, and thus, touching only a minimum area of the inside of the upper leg, in order to ensure leg guidance. This also eliminates pressure points in the genital region.

Indirect pressure by resting of the two halves of the buttocks against the sphincter, and thus, against the prostate, is for the most part reduced by the distance of the two seat halves 1 from one another being roughly 2 cm in the equilibrium state. Direct pressure on the sphincter and the perineum including the urethra is essentially completely precluded by the distance of the two seat halves 1 from one another. For the female rider, the relief of pressure points is also important to health. In particular, no fundamental modification of the saddle is necessary for the female rider. For child saddles, only the proportions need be changed. The saddle of invention is, of course, also suited for ergometers and stationary bicycles.

What is claimed is:

1. Saddle for pedal-powered devices, comprising:
   two seat halves which are spaced apart from one another, each of which is adapted to support one half of a rider's buttocks,
   a cup joint arrangement on a bottom side of each seat half, the cup joint arrangement having an essentially hollow spherical socket and a cup element which is movable in tile socket,
   a support rod wit two supports, each of the supports being attached to a respective cup element for enabling the saddle to be connected to a saddle support by means of the support rod, and
   each of the cup joint arrangements having a range of motion limiter for limiting the extent to which the cup element is movable in the socket,
   wherein the cup elements of the cup joint are movable in their respective socket around axes each of which is formed by a respective support and each support being angled outward relative to a longitudinal center plane of the saddle.

2. Saddle as claimed in claim 1, wherein the included angle between the cup joint axes is in a range of 10° to 300°.

3. Saddle as claimed in claim 1, wherein as a means for limiting the range of motion of the cup element in the socket, the cup element has a collar on at least one of a top end and a bottom end thereof, the collar striking an edge of the socket at an end of the range of motion.

4. Saddle as claimed in claim 3, wherein the edge of the socket and the collar of the cup element, which collar strikes the edge at the end of the range of motion, are matched to one another such that extended resting of the collar of the cup element on the edge of the socket occurs.

5. Saddle as claimed in claim 1, wherein an elastic spacer extends between the seat halves.

6. Saddle as claimed in claim 1, wherein the cup joint arrangement of each seat half comprises a flanged bearing.

7. Saddle as claimed in claim 1, wherein each of the supports is angled outward at an included angle of around 100° relative to a horizontal plane and is inclined forward at an included angle relative to a horizontal plane of about 74°.

8. Saddle as claimed in claim 1, wherein the socket is made of glass fiber reinforced plastic material.

9. Saddle for pedal-powered devices, comprising:

two seat halves which are spaced apart from one another, each of which is adapted to support one half of a rider's buttocks, a cup joint arrangement on a bottom side of each seat half, the cup joint arrangement having an essentially hollow spherical socket and a cup element which is movable in the socket, a support rod with two supports, each of the supports being attached to a respective cup element for enabling the saddle to be connected to a saddle support by means of the support rod, and each of the cup joint arrangements having a range of motion limiter for limiting the extent to which the cup element is movable in the socket, wherein the cup elements of the cup joint are movable in their respective socket, wherein each of the seat halves has a shape resembling one-half of a heart shape with a short and rounded tip which points forward, and wherein major axes along a respective greatest extension of each seat half are directed toward a longitudinal center plane of the saddle and form an included angle in a range of 50° to 65°.

10. Saddle as claimed in claim 9, wherein as a means for limiting the range of motion of the cup element in the socket, the cup element has a collar on at least one of a top end and a bottom end thereof, the collar striking an edge of the socket at an end of the range of motion.

11. Saddle as claimed in claim 10, wherein the edge of the socket and the collar of the cup clement which collar strikes the edge at the end of the range of motion, are matched to one another such that extended resting of the collar of the cup element on the edge of the socket occurs.

12. Saddle as claimed in claim 9, wherein the cup joint arrangement of each seat half comprises a flanged bearing.

13. Saddle as claimed in claim 9, wherein each cup joint arrangement is provided under the center of gravity of the respective seat half.

14. Saddle as claimed in claim 9, wherein said included angle is 57°.

15. Saddle as claimed in claim 9, wherein each of the supports is angled outward relative to a longitudinal center plane of the saddle and form an included angle of around 100° relative to a horizontal plane and is inclined upward and forward at an included angle relative to a horizontal plane of about 74°.

16. Saddle for pedal-powered devices, comprising:

two seat halves which are spaced apart from one another, each of which is adapted to support one half of a rider's buttocks, a cup joint arrangement on a bottom side of each seat half, the cup joint arrangement having an essentially hollow spherical socket and a cup element which is movable in the socket, a support rod with two supports, each of the supports being attached to a respective cup element for enabling the saddle to be connected to a saddle support by means of the support rod, and each of the cup joint arrangements having a range of motion limiter for limiting the extent to which the cup element is movable in the socket, wherein the cup element of each cup joint arrangement is movable in its respective socket around an axis that is formed by a respective support which is angled outward relative to a longitudinal center plane of the saddle.

17. Saddle as claimed in claim 16, wherein each of the supports is angled outward at an included angle of around 100° relative to a horizontal plane.

18. Saddle as claimed in claim 17, wherein each of the supports is inclined forward at an included angle relative to a horizontal plane of about 74°.

19. Saddle as claimed in claim 16, wherein as a means for limiting the range of motion of the cup element in the socket, the cup element has a collar on at least one of a top end and a bottom end thereof, the collar striking an edge of the socket at an end of the range of motion.

20. Saddle as claimed in claim 19, wherein the edge of the socket and the collar of the cup element, which collar strikes the edge at the end of the range of motion, are matched to one another such that extended resting of the collar of the cup element on the edge of the socket occurs.

21. Saddle as claimed in claim 16, wherein an elastic spacer extends between the seat halves.

22. Saddle as claimed in claim 16, wherein the cup joint arrangement of each seat half comprises a flanged bearing.

23. Saddle as claimed in claim 16, wherein each cup joint arrangement is provided under the center of gravity of the respective seat half.

24. Saddle as claimed in claim 16, wherein each of the seat halves has a shape resembling one-half of a heart shape with a short and rounded tip which points forward.

25. Saddle as claimed in claim 24, wherein major axes along a respective greatest extension of each seat half form an included angle in a range of 50° to 65°.

26. Saddle as claimed in claim 25, wherein said included angle is 57°.

* * * * *